United States Patent [19]
Wang et al.

[11] Patent Number: 5,910,865
[45] Date of Patent: Jun. 8, 1999

[54] SLIDER HAVING TERMINATED SIDE RAILS WITH TRAILING EDGE CUTS

[75] Inventors: Ling Wang, Minneapolis; Peter Crane, Richfield; Lei Zhang, Edina, all of Minn.

[73] Assignee: Seagate Technology, Inc., Scotts Valley, Calif.

[21] Appl. No.: 08/952,561

[22] PCT Filed: Feb. 12, 1997

[86] PCT No.: PCT/US97/02205

§ 371 Date: Oct. 29, 1997

§ 102(e) Date: Oct. 29, 1997

[87] PCT Pub. No.: WO98/32129

PCT Pub. Date: Jul. 23, 1998

Related U.S. Application Data

[60] Provisional application No. 60/035,011, Jan. 15, 1997.

[51] Int. Cl.$^6$ .................................................. G11B 21/21
[52] U.S. Cl. .............................................................. 360/103
[58] Field of Search ..................................... 360/103, 122

[56] References Cited

U.S. PATENT DOCUMENTS

| | | | |
|---|---|---|---|
| 4,673,996 | 6/1987 | White ........................................ | 360/103 |
| 4,734,803 | 3/1988 | Nishihira .................................. | 360/103 |
| 4,894,740 | 1/1990 | Chhabra et al. ......................... | 360/103 |
| 5,062,017 | 10/1991 | Strom et al. ............................. | 360/103 |
| 5,212,608 | 5/1993 | Yoneoka .................................. | 360/103 |
| 5,267,104 | 11/1993 | Albrecht et al. ..................... | 360/97.02 |
| 5,267,109 | 11/1993 | Chapin et al. ........................... | 360/103 |
| 5,274,518 | 12/1993 | Chapin et al. ........................... | 360/103 |
| 5,343,343 | 8/1994 | Chapin ..................................... | 360/103 |
| 5,396,387 | 3/1995 | Murray .................................... | 360/103 |
| 5,406,432 | 4/1995 | Murray .................................... | 360/103 |
| 5,430,591 | 7/1995 | Takeuchi et al. ...................... | 360/103 |
| 5,473,485 | 12/1995 | Leung et al. ............................ | 360/103 |

(List continued on next page.)

FOREIGN PATENT DOCUMENTS

| | | |
|---|---|---|
| 60-101781 | 6/1985 | Japan . |
| 1-211383 | 8/1989 | Japan . |
| 6-275038 | 9/1994 | Japan . |
| 8-255329 | 10/1996 | Japan . |

OTHER PUBLICATIONS

"IBM H–2344–A4 Disc Drive", Xerographic copy of photograph, Dec. 1993.

*Research Disclosure 25946*, "Roll Insensitive Slider Design for Improved Disk File Reliability", Disclosed anonymously, Nov. 1985.

*Primary Examiner*—Craig A. Renner
*Attorney, Agent, or Firm*—Westman, Champlin & Kelly, P.A.

[57] ABSTRACT

A disc head slider (36) includes a slider body with leading, trailing, inside and outside slider edges (50,52,54,56) and a slider center line (58) extending from the leading slider edge (50) to the trailing slider edge (52). First and second raised side rails (60,62) are formed in the slider body and each include an inside rail edge (108), an outside rail edge (110), a leading rail edge (50) and a trailing rail edge (112). The first and second raised side rails (60,62) form first and second bearing surfaces (70,72), respectively, which terminate prior to the trailing slider edge (52). A raised center rail (64) extends along the slider center line (58) and between the first and second raised rails (60,62). First and second cavities (80a,80b) are positioned between the raised center rail (64) and the first and second raised rails (60,62), respectively. The first and second bearing surfaces (70,72) each include a leading section (100), a waist section (104), a leg section (102) which extends from the waist section (104) to the leading section (100), and a trailing section (106) which extends from the waist section (104) to the trailing rail edge (112). The trailing section (106) widens from the waist section (104) toward the trailing rail edge (112) and includes a notch (113) positioned along the inside rail edge (108) which narrows the trailing section (106) at the notch (113).

8 Claims, 10 Drawing Sheets

U.S. PATENT DOCUMENTS

| | | | |
|---|---|---|---|
| 5,488,524 | 1/1996 | Cunningham | 360/103 |
| 5,490,025 | 2/1996 | Dorius et al. | 360/103 |
| 5,513,056 | 4/1996 | Kawasaki et al. | 360/103 |
| 5,515,219 | 5/1996 | Ihrke et al. | 360/103 |
| 5,550,692 | 8/1996 | Crane | 360/103 |
| 5,685,645 | 11/1997 | Nepela et al. | 360/103 |
| 5,721,650 | 2/1998 | Crane et al. | 360/103 |
| 5,739,981 | 4/1998 | Cha et al. | 360/103 |

SLIDER HAVING TERMINATED SIDE RAILS WITH TRAILING EDGE CUTS

CROSS-REFERENCE TO RELATED APPLICATION

This application claims priority from U.S. Provisional Application No. 60/035,011, filed Jan. 15, 1997 abandoned and from International Application No. PCT/US97/02205, filed Feb. 12, 1997.

BACKGROUND OF THE INVENTION

The present invention relates to disc drive storage systems and, more particularly, to a disc head slider having rails with trailing edge cuts.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces. An actuator mechanism moves the sliders from track to track across the surfaces of the discs under control of electronic circuitry. The actuator mechanism includes a track accessing arm and a suspension for each head gimbal assembly. The suspension includes a load beam and a gimbal. The load beam provides a preload force which forces the slider toward the disc surface. The gimbal is positioned between the slider and the load beam to provide a resilient connection that allows the slider to pitch and roll while following the topography of the disc. The slider includes an air bearing surface which faces the disc surface.

There are generally two types of sliders, positive pressure air bearing (PPAB) sliders and self-loading or "negative pressure" air bearing (NPAB) sliders. An NPAB slider typically has a pair of rails extending along the sides of the bearing, with a cavity dam extending between the rails near the leading end of the slider. As the disc rotates, the surface of the disc drags air under the cavity dam by viscous friction exerted by the disc surface. As the air passes over the cavity dam, the air expands into a "cavity" between the rails, which forms a partial vacuum in the cavity. The partial vacuum draws the slider closer to the disc surface and counteracts positive pressure developed along the rails. The cavity is open to atmospheric pressure at the trailing end of the slider, and may also include a center rail or an island at the trailing end of the slider to mount a single recording head. NPAB surfaces have many advantages, such as reduced take off and landing velocity during spindle start up and shut down, high bearing stiffness and lower sensitivity of flying height to changes in altitude and velocity, as compared to PPAB sliders having no cavity dam.

However, NPAB sliders are seldom used in ramp "load-unload" drive applications because of their high suction force. In these applications, the slider is unloaded from the disc surface by rotating the actuator mechanism until the suspension engages a ramp which lifts the suspension and thus the slider from the disc surface. The high suction force prevents an NPAB slider from following the suspension as the suspension rides up on the unloading ramp. The slider remains in close proximity to the spinning disc causing the ramp to elastically deform the suspension. The NPAB suction force breaks only when a significant elastic strain has accumulated in the suspension. The release of the suction force releases the elastic strain in the suspension and allows the slider to unload from the disc surface. This cycle of suction force and strain release occurs very rapidly relative to the time in which the suspension is in contact with the unloading ramp. The rapid release of elastic strain energy sets up vibratory oscillations in the slider position coordinate that is normal to the plane of the disc surface. These oscillations may be large enough to cause the slider to "slap" against the disc surface, thereby generating wear debris particles and possibly damaging the recording head.

Another problem observed with NPAB sliders during unloading occurs in the event that the unloading force exerted by the deformed suspension is too small to overcome the suction force. In this event, the suction force is broken when the slider is swung over the disc perimeter, allowing the atmosphere to flow into the cavity between the side rails with very little resistance. As the slider passes over the disc perimeter, pressurization between the side rails becomes unbalanced, causing the slider to roll to one side. As a result, the slider may contact the disc perimeter when unloading. Repetition of such contact causes wear on the slider and generates debris particles.

In contrast, PPAB sliders have a low suction force, making them more applicable for ramp load-unload drive applications than NPAB sliders. Although the side rails in a PPAB slider are not connected by a cavity dam, some air expansion typically occurs as the air is dragged under slider, if the slider has side rails with wide leading ends that transition to a narrow sections near the middle of the slider. The suction force due to these expansions is somewhat smaller than that obtained with the expansion over a cavity dam in an NPAB slider, which allows PPAB sliders to be used more effectively in ramp load-unload applications. In certain PPAB sliders designs, however, the suction drawn at the disc OD may be large enough to result in an undesirably low flying height at the disc OD and adverse effects on unloading performance.

Sliders having "hour glass" shaped rails have been used to counteract the reduction in flying height at the disc OD by reducing the effects of skew. An hour glass shaped rail has wide leading and trailing ends and a narrow waist section. In a typical 3.0 inch disc drive, the skew angle at the disc OD is larger in absolute value than the skew angle at the disc ID. Therefore, hour glass shaped rails tend to increase the flying height at the disc OD relative to the flying heights at the disc ID and the disc MD. However, the flying height at the disc middle diameter (MD) becomes significantly higher than at the disc ID and at the disc OD. This is typically quantified as the "MD hump" which is defined as the MD flying height minus the average of the ID and OD flying heights. A typical MD hump is over 0.3 microinches. An MD hump of this magnitude degrades the recording performance at the disc MD due to fringing field losses in the air gap between the magnetic recording head and the disc surface.

SUMMARY OF THE INVENTION

The disc head slider of the present invention includes a slider body with leading, trailing, inside and outside slider edges and a slider center line extending from the leading slider edge to the trailing slider edge. First and second raised side rails are formed in the slider body and each include an inside rail edges an outside rail edge, a leading rail edge and a trailing rail edge. The first and second raised side rails form first and second bearing surfaces, respectively, which terminate prior to the trailing slider edge. A raised center rail extends along the slider center line and between the first and second raised rails. First and second cavities are positioned between the raised center rail and the first and second raised rails, respectively. The first and second bearing surfaces each include a leading sections a waist section, a leg section which extends from the waist section to the leading section, and a trailing section which extends from the waist section to the trailing rail edge. The trailing section widens from the waist section toward the trailing rail edge and includes a notch positioned along the inside rail edge which narrows the trailing section at the notch. In another embodiment, the notch is positioned along the outside rail edge.

DETAILED DESCRIPTION OF THE PREFERRED EMBODIMENTS

Figure 1:
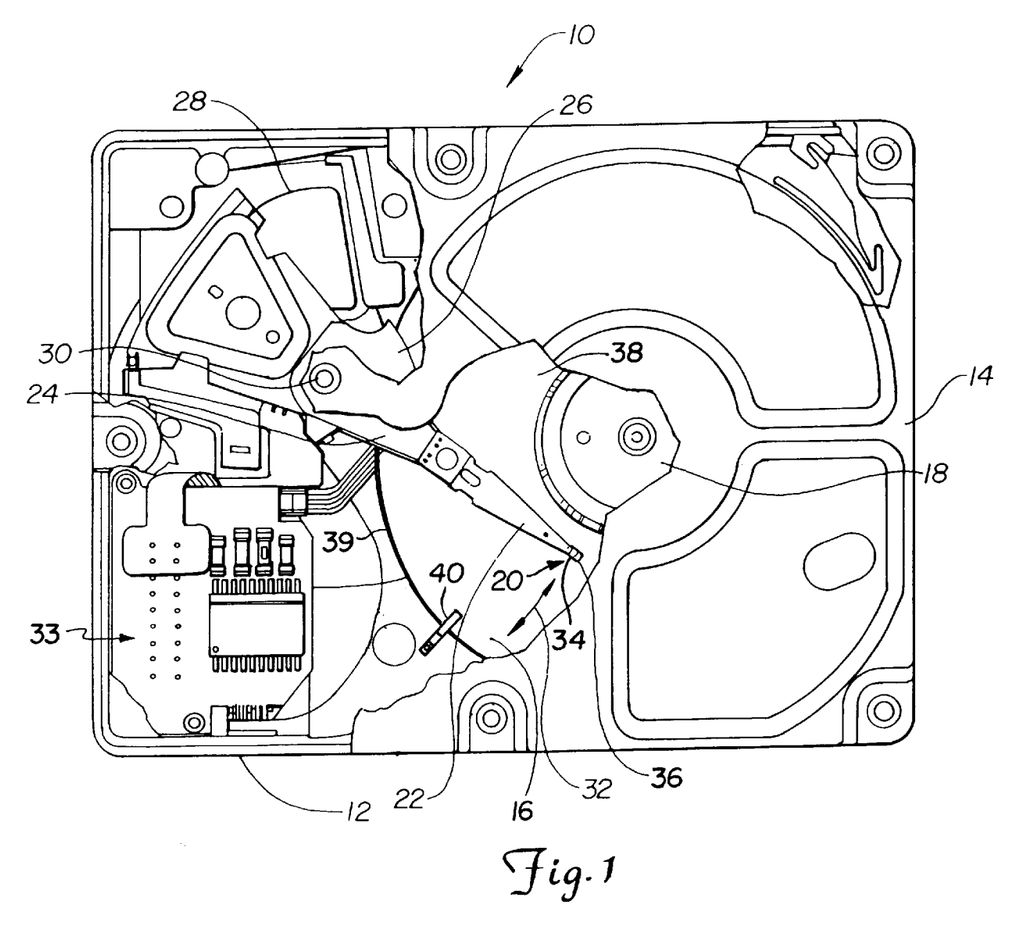
FIG. 1 is a top plan view of a disc drive data storage device in which the present invention is useful.

FIG. 1 is a plan view of a typical disc drive 10. Disc drive 10 includes a housing with a base 12 and a top cover 14 (sections of top cover 14 are removed for clarity). Disc drive 10 further includes a disc pack 16, which is mounted on a spindle motor (not shown) by a disc clamp 18. Disc pack 16 includes a plurality of individual discs which are mounted for co-rotation about a central axis. Each disc surface has an associated head gimbal assembly (HGA) 20 which is mounted to disc drive 10 for communication with the disc surface. Each HGA 20 includes a gimbal 34 and a slider 36. In the example shown in FIG. 1, HGAs 20 are supported by load beam flexures 22 which are in turn attached to track accessing arms 24 of an actuator 26. The gimbal and the load beam flexure are together referred to as a suspension.

The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position HGA 20 over a desired data track under the control of electronic circuitry 33. HGA 20 travels along an arcuate path 32 between a disc inner diameter (ID) 38 and a disc outer diameter (OD) 39.

Disc drive 10 further includes a slider load-unload ramp 40. When voice coil motor 28 rotates actuator 26 to the disc OD 39, flexure 22 rides up ramp 40 causing HGA 20 to lift off of the surface of disc 16. Similarly, upon start-up, voice coil motor 28 rotates actuator 26 such that flexure 22 rides down ramp 40 until HGA 20 is positioned over the surface of disc 16.

Figure 2:
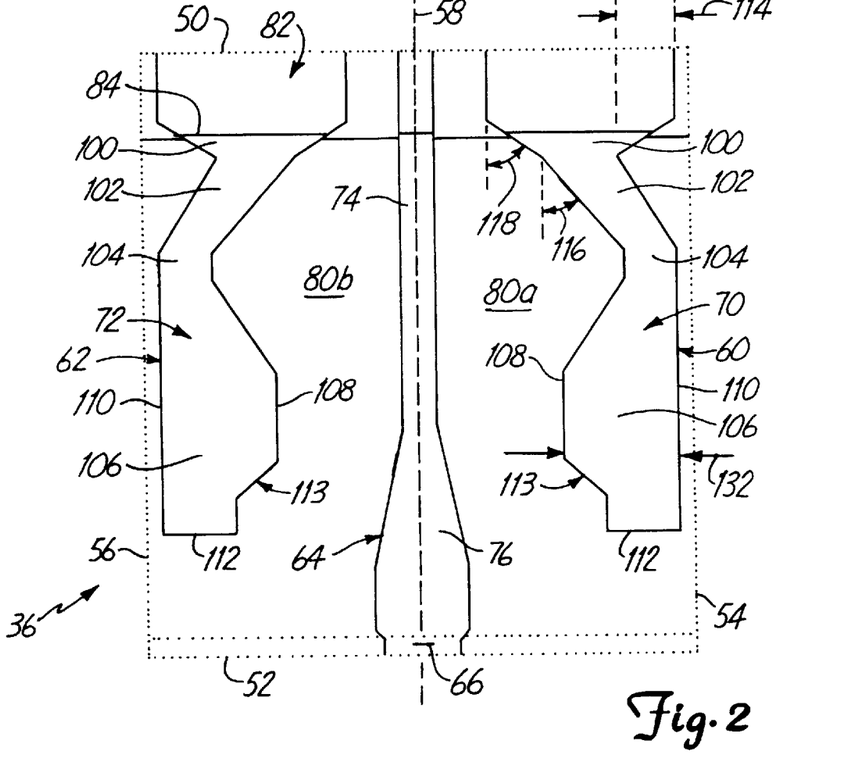
FIG. 2 is a plan view of a slider having side rail notches according to one embodiment of the present invention.
Figure 3:
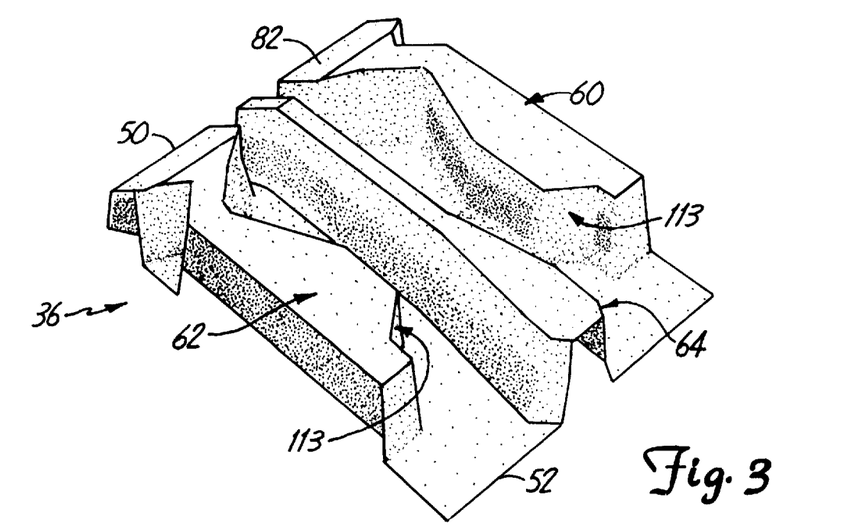
FIG. 3 is perspectives computer-generated illustration of the slider shown in FIG. 2.

FIGS. 2 and 3 show slider 36 in greater detail, which includes notches in the trailing sections of the side rails,, according to one embodiment of the present invention. The notches provide a slider with a more flat flying height profile across the surface of disc 16. FIG. 2 is a plan view of slider 36 while FIG. 3 is a perspective, computer-generated illustration of slider 36.

Slider 36 includes leading edge 50, trailing edge 52, side edges 54 and 56 and center line 58. Slider 36 further includes raised side rails 60 and 62, raised center rail 64 and transducer 66. Side rails 60 and 62 are positioned along side edges 54 and 56, respectively, and form air bearing surfaces 70 and 72, respectively. Center rail 64 is positioned along slider center line 58 and supports transducer 66 adjacent to trailing edge 52 for communicating with the disc surface.

Slider 36 further includes ambient pressure cavities 80a and 80b which are positioned between center rail 64 and side rails 60 and 62, respectively. Cavities 80a and 80b are open to ambient atmospheric pressure at leading edge 50 and at trailing edge 52. Cavities 80a and 80b are formed by ion milling, chemical etching or Reactive Ion Etching (RIE) for example, with a single masking and etching iteration. A lapped leading taper 82 is formed along leading edge 50 and extends from leading edge 50 to an intersection 84 with air bearing surfaces 70 and 72.

In one embodiment, slider 36 is a "50-series" slider, which has a length of about 2.00 millimeters and a width of about 1.60 millimeters. However, in other embodiments, slider 36 can have other sizes, such as the size of a "30-series" slider with a length of 1.25 millimeters and a width of 1.0 millimeters.

Center rail 64 has a relatively narrow leading section 74 and a relatively wide trailing section 76. Leading section 74 has a substantially constant width from leading edge 50 to trailing section 76. Trailing section 76 gradually increases in width from leading section 74 toward trailing edge 52 such that center rail 64 is wide enough at the trailing edge to hold transducer 66.

Side rails 60 and 62 extend from leading edge 50 toward trailing edge 52 and terminate prior to the trailing edge. Side rail 60 is an "inner" rail which flies closest to the disc ID and side rail 62 is an "outer" rail which flies closest to the disc OD. Slider 36 is a symmetric slider which allows either rail to be denominated as the outer rail by assigning the disc surface to be used as an "up facing" or a "down facing" disc surface.

Side rails 60 and 62 each include a relatively wide leading section 100, a leg section 102, a relatively narrow waist section 104 and a relatively wide trailing section 106. Side rails 60 and 62 further include an inside edge 108, an outside edge 110 and a trailing edge 112. Leading section 100 extends from leading edge 50 to leg section 102. Leg section 102 extends from leading section 100 to waist section 104. Trailing section 106 extends from waist section 104 to trailing rail edge 112 and widens toward waist section 106.

However, trailing section 106 has a notch 113 positioned along inside rail edge 108 and adjacent trailing rail edge 112, which narrows the trailing section along the notch.

Leg sections 102 of side rails 60 and 62 angle toward center rail 64 as they extend forward from waist section 104 to leading section 100. This causes inside edges 108 and outside edges 110 to converge toward slider center line 58 along leg section 102 and causes leg portion 102 to have an offset 114 toward center line 58 at leading section 100. Offset 114 can have a range 1 to 12 mils, for example, in a 50-series slider. Inside edges 108 converge toward center line 58 at a first angle 116 along leg section 102 and then at a second angle 118 along leading section 100 as the inside edges cross intersection 84. Outside edges 110 diverge from center line 58 along leading section 100 and crosses intersection 84 a similar angle as inside edges 108. Inside edges 108 and outside edges 110 then extend parallel to center line 58 to leading edge 50.

It has been discovered that if inside edges 108 and outside edges 110 cross intersection 84 at an acute angle, preferably 20–70 degrees, that the outer rail flying height becomes less sensitive to variations in the location of intersection 84 due to fabrication tolerances. Slider 36 is fabricated by first lapping a flat surface over most of the length of the slider and then lapping leading taper 82 along leading edge 50. The air bearing surface features are then formed through photolithographic masking and etching techniques. Finally, a crown is lapped onto the air bearing surface by pressing the slider against spherically shaped lapping plate The spherical shape of the lapping plate is then transferred onto the finished air bearing surface. Variations in the stock removal during the crown lapping process results in a variation of the location of the intersection 84 between leading taper 82 and air bearing surfaces 70 and 72, which would otherwise have significant effects on the outer rail fly height.

Another advantage of the shape of side rails 60 and 62 is that by offsetting outside edges 110 of rails 60 and 62 toward center line 58, the disc tangential velocity intersects the outside edges of leg sections 102 at an angle. This "angled leading rail" configuration results in a reduction of the flying height at the disc middle diameter (MD) by reducing the skew sensitivity of slider 36. This improves the recording bit density on the middle data tracks in the disc drive. The middle diameter flying height (MDFH) is commonly quantified relative to the inner diameter flying height (IDFH) and the outer diameter flying height (ODFH) by an "MD hump" parameter, where:

MD Hump=MDFH−[(IDFH+ODFH)/2]

The MD hump reflects a deviation of the middle diameter flying height from an ideal straight-line flying height profile between the inner diameter flying height and the outer diameter flying height.

Another advantage of the angled leading rail feature is that it produces a relatively low suction force of about 1.5 gmf at the disc OD, which improves the ramp unloading performance of slider 36. This is due to the reduced area of cavities 80a and 80b between side rails 60 and 62 caused by the offset of leg sections 102 toward center line 58.

However, reducing the skew sensitivity and reducing the OD suction force tends to adversely increase the flying height at the disc OD. The skew angle at the disc OD is typically larger than the skew angle at the disc ID. Therefore, the angled leading rail feature tends to increase the flying height at the disc OD relative to the flying height at the disc ID.

Notches 113 in trailing sections 106 of side rails 62 and 60 counteract the increase in flying height at the disc OD. Notches 113 are cut into inside rail edges 108 of side rails 62 and 64 adjacent trailing rail edges 112 and extend from cavities 80a and 80b toward side edges 54 and 56, respectively. As a result, trailing sections 106 narrow from a maximum width 132 to a width 134 along notches 113.

The lift force on trailing sections 106 is equal to the pressure along trailing sections 106 times the area of trailing sections 106 By cutting trailing sections 106 along notches 113, the lift force at trailing rail edge 112 decreases, resulting in a lower flying height at the disc OD which counter acts the increase in flying height caused by the skew insensitivity of the angled leading rail features and the hour glass shape of the rails.

Figure 4:
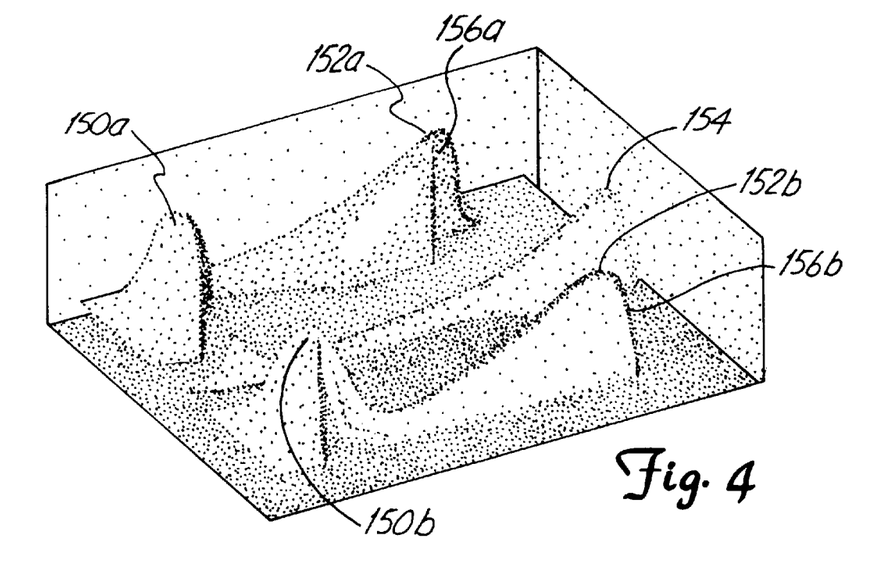
FIGS. 4 and 5 show pressure distribution profiles of the slider shown in FIGS. 2 and 3.
Figure 5:
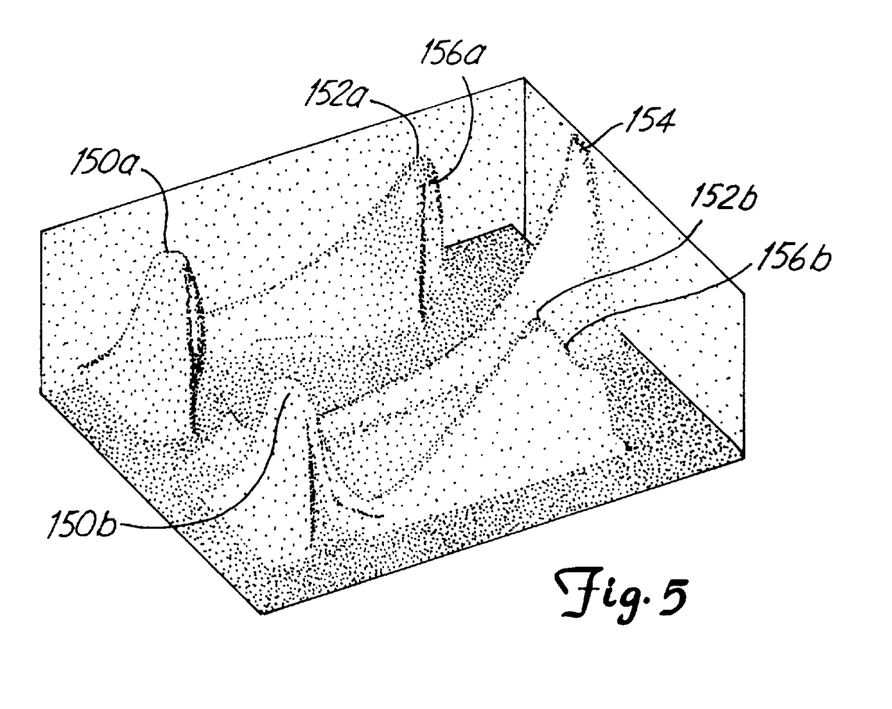

FIGS. 4 and 5 show the pressure distribution profiles of slider 36 at the disc ID and the disc OD, respectively. Pressure peaks 150a and 150b represent the pressure on leading sections 100 of side rails 60 and 62, respectively, and pressure peaks 152a and 152b represent the pressure peaks on trailing sections 106 of side rails 60 and 62, respectively. Pressure peak 154 represents the pressure on trailing section 76 of center rail 64. Pressure peaks 152a and 152b include low pressure areas 156a and 156b corresponding to notches 113. The flying height at the disc ID decreases as the total lift force at trailing rail edges 112 decreases. However, the flying height at the disc OD decreases more than the flying height at the disc ID. This phenomenon is explained as follows. The dual pressure peaks 152a and 152b are larger at the disc OD than at the disc ID because of the greater tangential velocity of the disc at the disc OD. A greater tangential velocity results in a greater lift force. Therefore, the pressure lost in the low pressure areas 156a and 156b due to notches 113 is greater at the disc OD than at the disc ID. The relatively large pressure loss at the disc OD results in reduced lift, and consequently a lower flying height at the disc OD without an appreciable drop in the flying height at the disc ID.

The combination of the notches, the angled leading rail feature and the edges of the side rails crossing the taper intersection at an acute angle thus gives slider 36 a low, flat flying profile across the surface of the disc with a greatly reduced MD hump, a greatly reduced OD suction force and a stable, low flying height at the disc OD. Slider 36 is therefore particularly useful for ramp load-unload disc drive applications with small disc diameters and relatively large skew angles.

Figure 6:
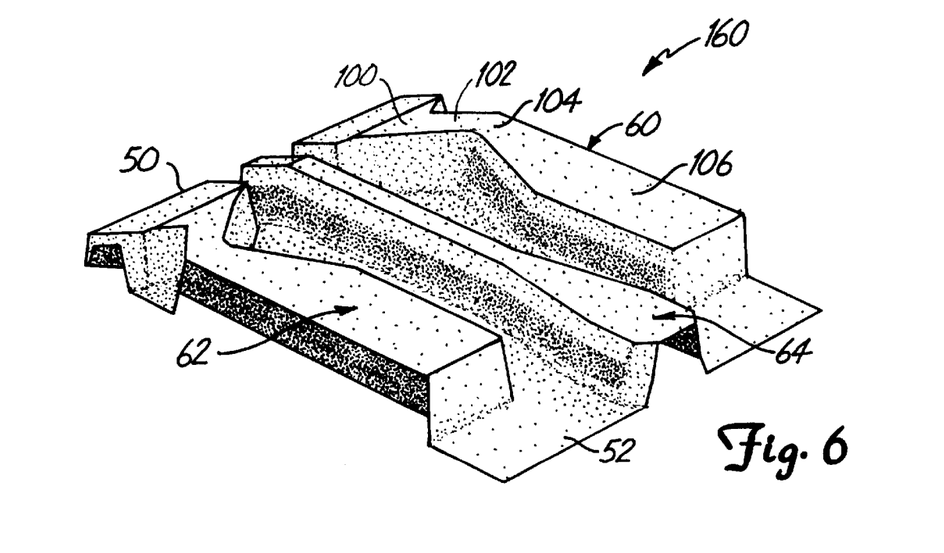
FIG. 6 is a perspective, computer-generated illustration of a slider which lacks side rail notches.

FIG. 6 is a perspective, computer-generated illustration of a slider 160 which is similar to slider 36, but does not have notches cut in the trailing sections of the side rails. The same reference numerals that were used in FIGS. 2 and 3 are used in FIG. 6 and in the remaining figures for the same or similar elements.

Figure 7:
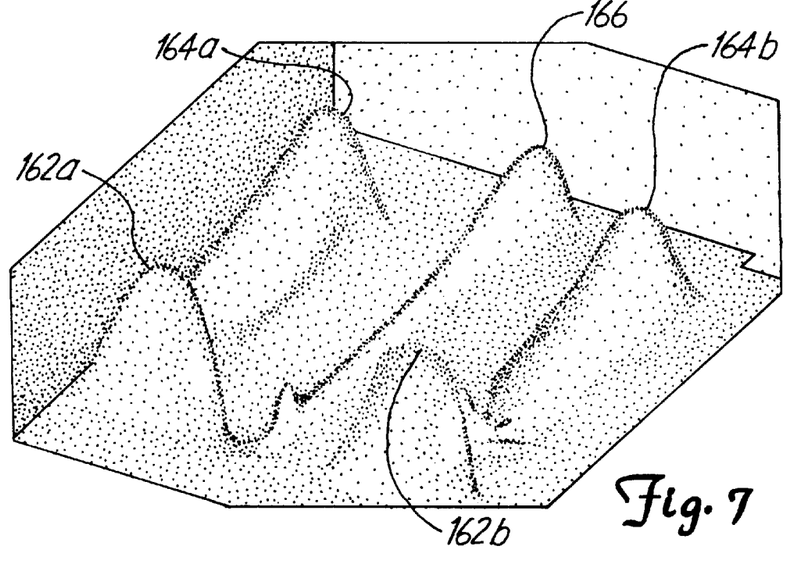
FIGS. 7 and 8 illustrate pressure distribution profiles of the slider shown in FIG. 6.
Figure 8:
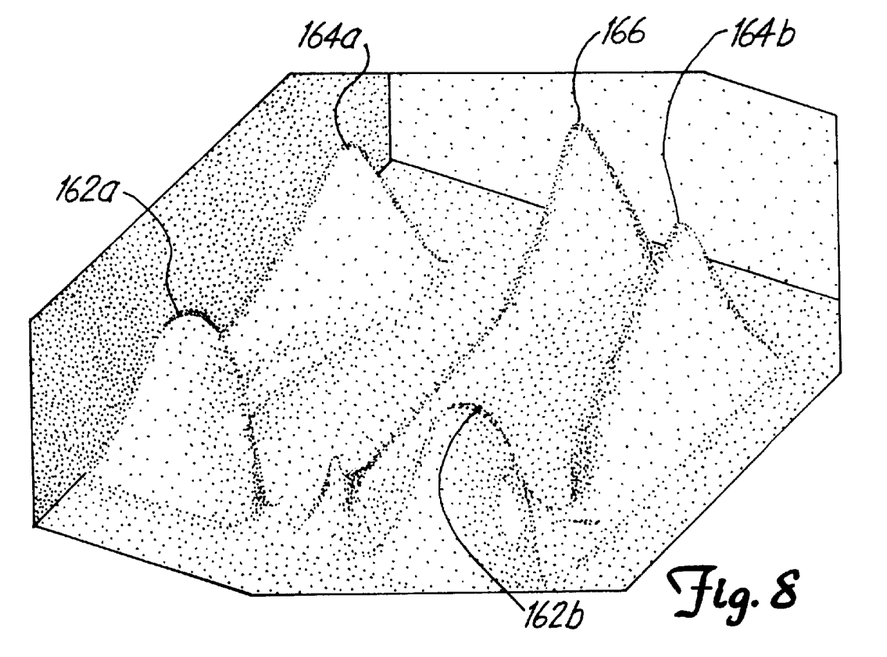

FIGS. 7 and 8 illustrate the pressure distribution of slider 160 at the disc ID and at the disc OD, respectively Pressure peaks 162a and 162b represent the pressure on leading sections 100 of side rails 60 and 62, respectively. Pressure peaks 164a and 164b represent the pressure on trailing sections 106 of side rail 60 and 62, respectively. Pressure peak 166 represents the pressure on trailing section 76 of center rail 64. Pressure peaks 164a and 164b are much greater at the disc OD then at the disc ID, which results in a greater flying height at the disc OD. Comparing FIG. 8 to FIG. 5, and comparing FIG. 7 to FIG. 4, the addition of notches 113 significantly decrease the pressure peaks on trailing sections 106 at the disc OD without significantly decreasing the pressure peaks at the disc ID. This results in a more even pressure profile between the disc ID and the disc OD, which results in a flatter fly height profile.

Figure 9:
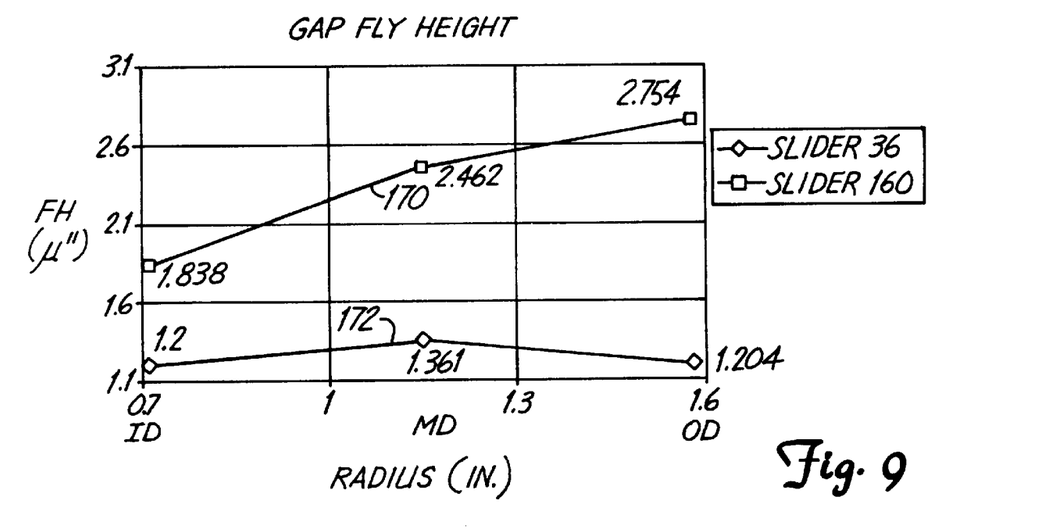
FIG. 9 is a graph comparing the fly height profiles of the sliders shown in FIGS. 2, 3 and 6.

FIG. 9 is a graph of the fly height profiles of sliders 36 and 160 at the disc ID, MD and OD in a 3.0 inch disc drive. Line 170 represents the transducer gap flying height of slider 160, and line 172 represent the transducer gap flying height of slider 36. Slider 160 has a rise in flying height from the disc ID to the disc OD of 0.92 microinches. Slider 36 has rise in flying height from the disc ID to the disc OD of only 0.04 microinches, with an MD hump of only 0.16 microinches.

Figure 10:
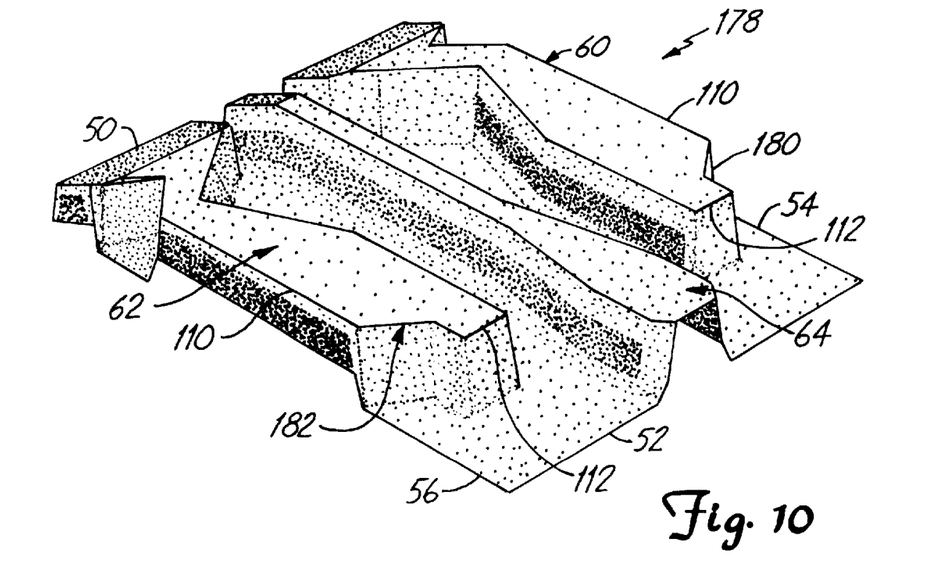
FIGS. 10 and 11 are perspective, computer-generated illustrations of sliders according alternative embodiments of the present invention.
Figure 11:
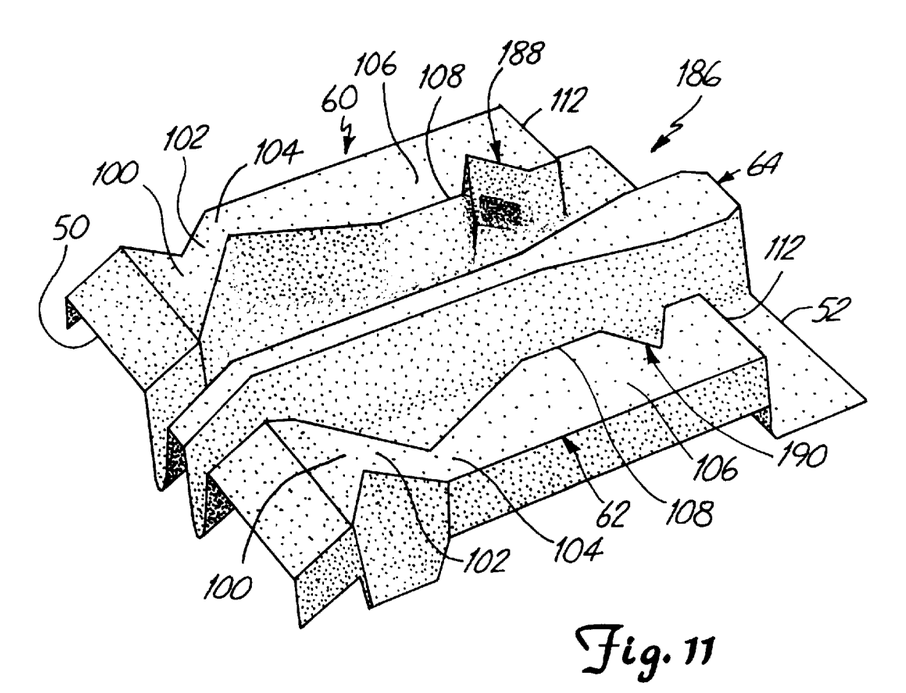

FIGS. 10 and 11 are perspective, computer-generated illustrations of sliders according to alternative embodiments of the present invention. In FIG. 10, slider 178 has notches 180 and 182 which are positioned along outside edges 110 of side rails 60 and 62. In FIG. 11, slider 186 has notches 188 and 190 which are positioned along inside edge 108 of side rails 60 and 62 similar to notches 113 shown in FIGS. 2 and 3, but are spaced upstream of trailing rail edges 112, along trailing sections 106. In this embodiment, notches 188 and 190 do not extend to or communicate with trailing rail edges 112.

Figure 12:
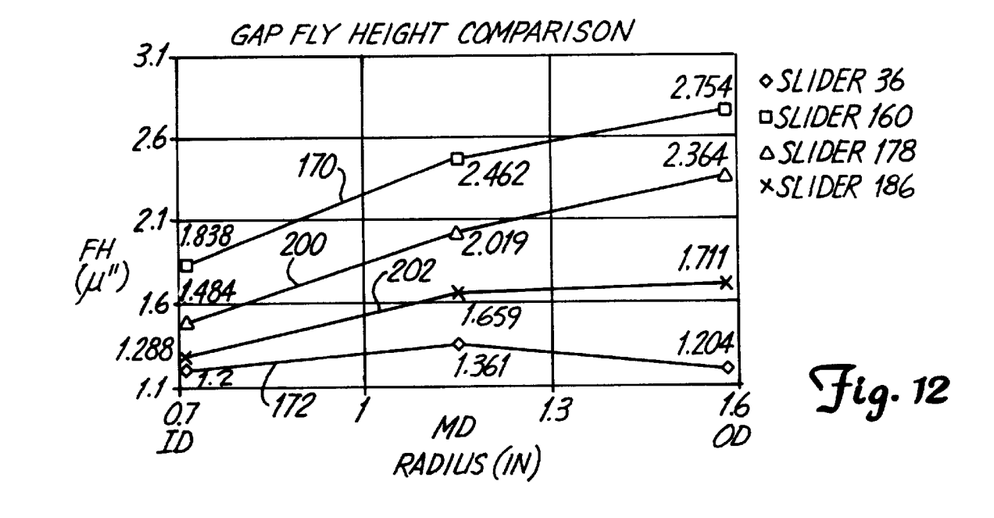
FIG. 12 is a graph comparing the flying height profiles of the sliders shown in FIGS. 2, 3, 6, 10 and 11.

FIG. 12 is a graph illustrating the transducer gap flying heights of sliders 36, 160, 178 and 186 at the disc ID, MD and OD. Once again, lines 170 and 172 represent the flying heights of sliders 160 and 36, respectively. Line 200 represents the flying height of slider 178. Line 202 represents the flying height of slider 186. All three sliders of the present invention have a smaller rise in fly height from the disc ID to the disc OD as compared to slider 160 shown in FIG. 6. In addition, sliders 36 and 186, which have notches on the inside rails edges, have a smaller rise in fly height from the disc ID to the disc OD as compared to slider 178, which has notches on the outside rail edges.

Figure 13:
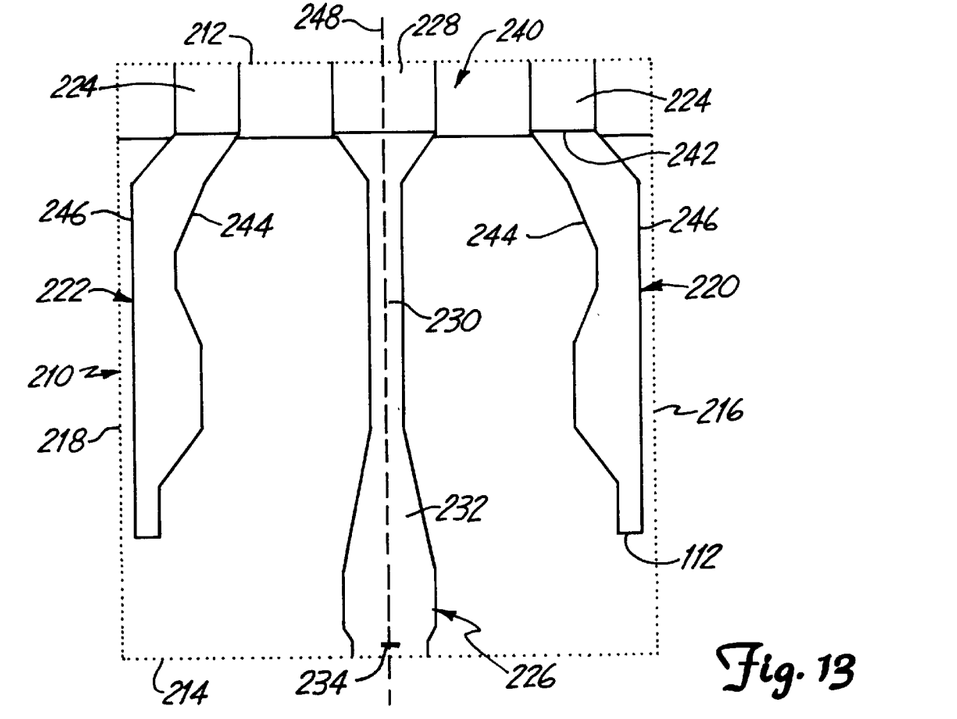
FIG. 13 is a top plan view of a slider according to another alternative embodiment of the present invention.
Figure 14:
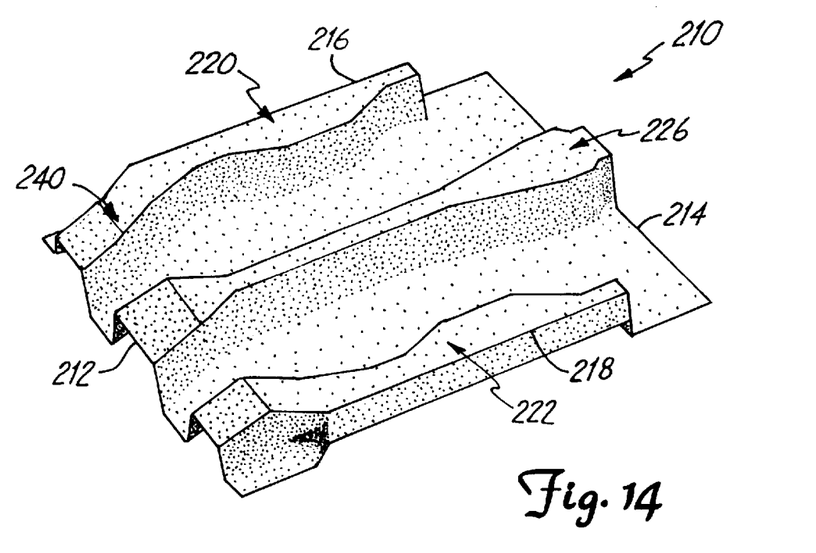
FIG. 14 is perspective, computer-generated illustration of the slider shown in FIG. 13.

FIGS. 13 and 14 show a slider according to another alternative embodiment of the present invention. Slider 210 includes leading edge 212, trailing edge 214, side edge 216 and side edge 218. Side rails 220 and 222 extend from leading edge 212 towards trailing edge 214, along side edges 216 and 218, respectively. Side rails 220 and 222 terminate prior to trailing edge 214. Side rails 220 and 222 have narrow leading sections 224 relative to leading sections 100 of the embodiments shown in FIGS. 2 and 3. Additionally, slider 210 has a center line 248 and a center rail 226 with a wide leading section 228 a narrow center section 230 and a trailing section 232 which gradually increases in width to transducer 234 at trailing edge 214. A leading taper 240 is lapped into slider 210 along leading edge 212. Leading taper 240 forms an intersection 242 with the air bearing surfaces formed by side rails 220 and 222 and center rail 226. Side rails 220 and 222 have inside edges 244 and outside edges 246. Reducing the width of leading sections 224 of side rails 220 and 222 and increasing the width of leading section 228 of center rail 226 reduces the sensitivity of the flying height of slider 210 to altitude. In one embodiment, the sensitivity of the flying height was reduced by 40 percent at the disc ID and 15 percent at the disc OD relative to slider 36 shown in FIGS. 2 and 3. This reduction in altitude sensitivity increases the reliability of the disc drive in environments of low ambient pressure such as airline cabins, which are typically pressurized to a value corresponding to about 7,000 feet altitude in open air.

Figure 15:
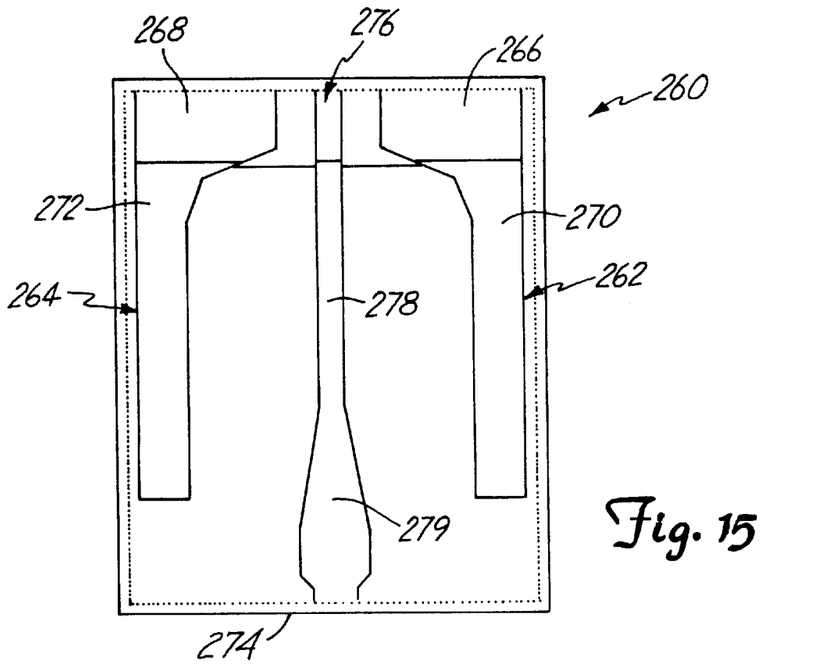
FIGS. 15 and 16 are top plan views of slider configurations that were compared, to the slider configurations of the present invention.
Figure 16:
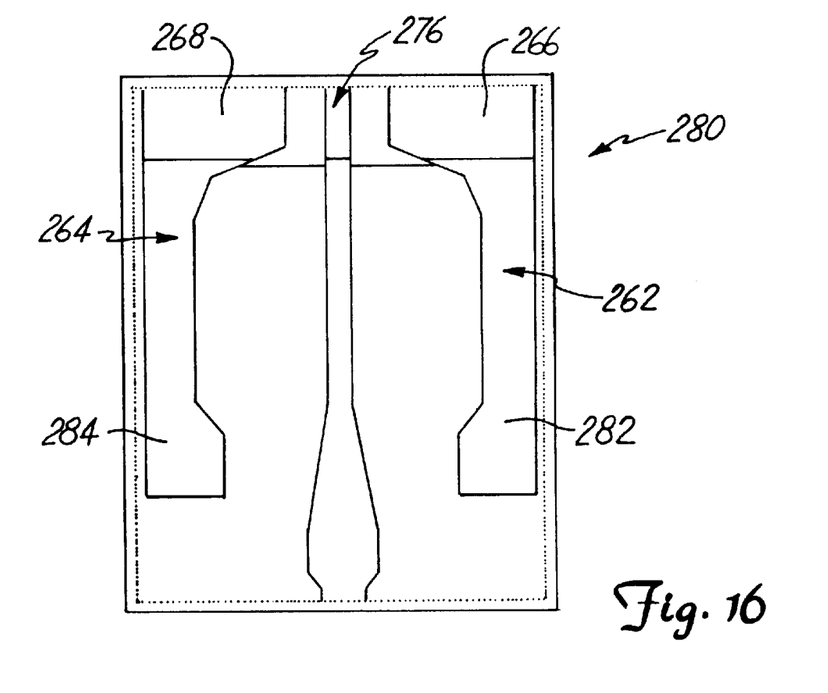

The flying height characteristics of the sliders of the present invention were also compared to the sliders shown in FIGS. 15 and 16. In FIG. 15, slider 260 has side rails 262 and 264 which have relatively wide leading sections 266 and 268 that transition to narrow trailing sections 270 and 272. Trailing sections 270 and 272 terminate prior to a trailing edge 274 of slider 260. Slider 260 further includes a center rail 276 which has a relatively narrow, straight leading section 278 and a trailing section 279 which gradually increases in width to trailing edge 274.

In FIG. 16, slider 280 is similar to slider 260, but side rails 262 and 264 include relatively wide trailing sections 282 and 284. Neither slider 260 nor slider 280 has notches in the trailing sections of the rails or has the angled leading rail feature in which the outside edges of the rails converge toward center rail 276 near leading sections 266 and 268.

Figure 17:
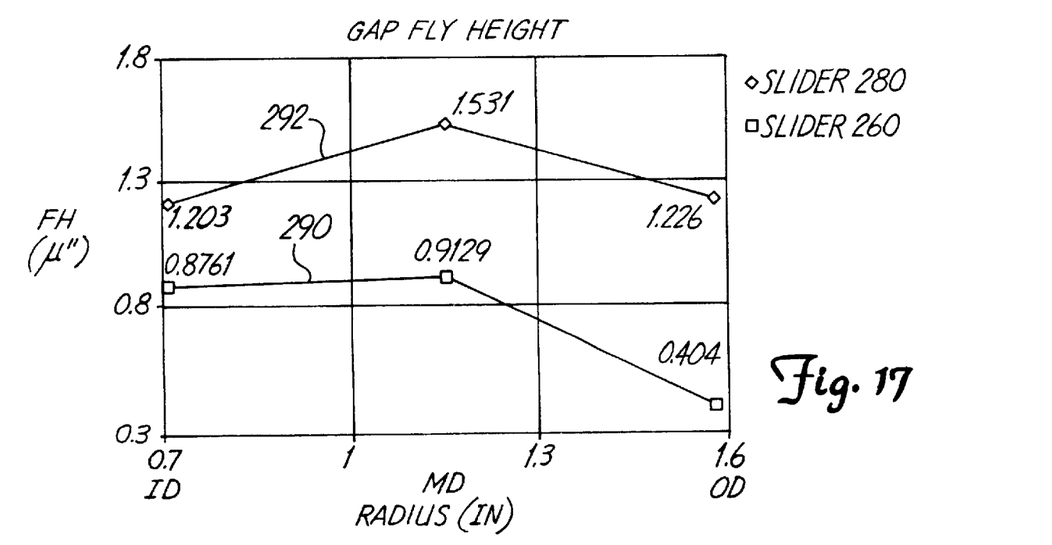
FIG. 17 is a graph illustrating the fly height profiles of the sliders shown in FIGS. 15 and 16.

FIG. 17 is graph of the transducer gap flying height of sliders 260 and 280 at the disc ID, MD and OD. Line 290 represents the flying height of slider 260, and line 292 represents the flying height of slider 280. Slider 260 draws about 3.0 gmf suction at the disc OD of a typical 3.0" disc drive. The large suction force draws slider 260 closer to the disc surface at the disc OD, which may result in an undesirably low flying height at the disc OD, as shown by line 290, and adverse effects on unloading performance. The wide trailing pads formed by trailing sections 282 and 284 of slider 280 help increase the OD flying height, as shown by line 292, by reducing the effect of skew angle. However, slider 280 has a significantly higher flying height at the disc MD than at the disc ID or the disc OD. The MD hump for slider 280 is approximately 0.32 microinches, as compared to the MD hump of 0.16 microinches for slider 36 of the present invention.

The slider of the present invention not only provides a low suction force at the disc OD for ramp load-unload drive applications, but also tends to reduce the rise in flying height from the disc ID to the disc OD, which allows for more efficient magnetic recording and increased data storage capacity in a disc drive.

Figure 18:
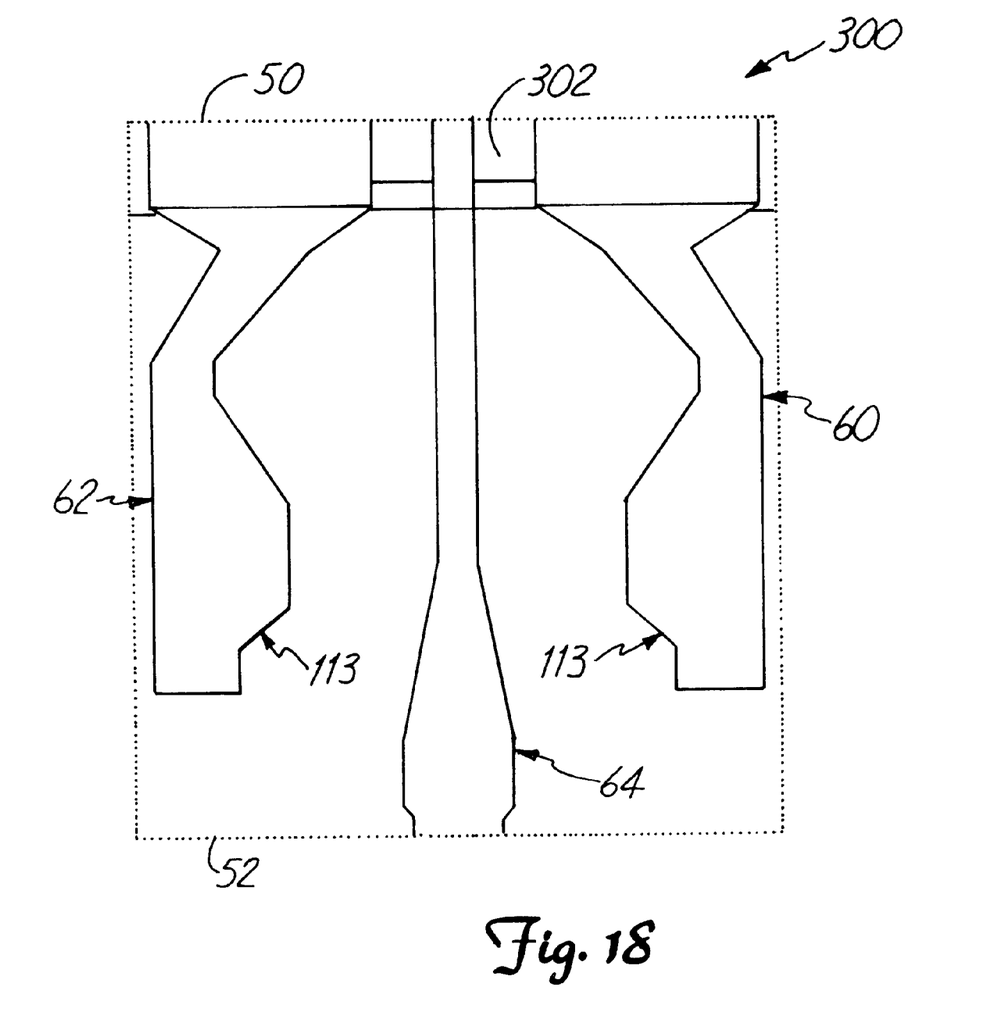
FIG. 18 is a plan view of an NPAB slider having notches according to the present invention.

FIG. 18 is a plan view of an NPAB slider having notches according to the present invention. In FIG. 18, slider 300 includes side rails 60 and 62 and center rail 64, similar to the embodiment shown in FIGS. 2 and 3, and further includes a cavity dam 302 extending from side rail 62 to side rail 64.

Although the present invention has been described with reference to preferred embodiments, workers skilled in the art will recognize that changes may be made in form and detail without departing from the spirit and scope of the invention.

What is claimed is:

1. A disc head slider comprising:

leading, trailing, inside and outside slider edges;

a slider center line extending from the leading slider edge to the trailing slider edge;

first and second raised rails, each rail comprising an inside rail edge, an outside rail edge, a leading rail edge and a trailing rail edge, and forming first and second bearing surfaces, respectively, which terminate prior to the trailing slider edge;

a raised center rail extending along the slider center line and between the first and second raised rails and comprising a leading section, a waist section and a trailing section, wherein the leading and trailing sections of the raised center rail are each wider than the waist section of the raised center rail;

a tapered surface formed within the first and second raised rails and extending from the leading slider edge to an intersection with the first and second bearing surfaces;

first and second cavities positioned between the raised center rail and the first and second raised rails, respectively, and extending from the leading slider edge to the trailing slider edge;

wherein the first and second raised rails each further comprises a leading section, a waist section, a leg section which extends from the waist section of the respective first and second raised rails to the leading section of the respective first and second raised rails and a trailing section which extends from the waist section of the respective first and second raised rails to the respective trailing rail edge of the first and second raised rails and wherein the trailing sections of the first and second raised rails widen from the waist sections of the first and second raised rails toward the trailing rail edges of the first and second raised rails and each trailing section of the first and second raised rails comprises a notch along at least one of the inside and outside rail edges which narrows the respective trailing section of the first and second raised rails at the notch; and wherein the inside and outside rail edges converge toward the slider center line for a distance along the leg sections, between the waist sections of the first and second raised rails and the leading sections of the first and second raised rails.

2. A disc drive assembly comprising:

a housing;

a disc mounted in the housing for rotation about a central axis;

a rotary slider support structure rotatably mounted in the housing; and a slider supported over the disc by the rotary slider support structure and comprising:

leading and trailing slider edges;

a slider center line extending between the leading and trailing slider edges;

first and second elongated raised rails which are disposed about the slider center line, terminate prior to the trailing slider edge, and comprise leading, trailing and waist sections and inside rail edges, wherein the first and second raised rails narrow from the leading and trailing sections of the first and second raised rails to the waist sections of the first and second raised rails;

a notch positioned along each inside rail edge of the first and second raised rails, which narrows the respective trailing section of the first and second raised rails at the notch;

a third elongated raised rail which extends along the slider center line and comprises leading, trailing and waist sections, wherein the third raised rail narrows from the leading and trailing sections of the third raised rail to the waist section of the third raised rail, and wherein the leading section of the third raised rail is wider than the leading sections of the first and second raised rails, respectively; and first and second cavities positioned between the third raised rail and the first and second raised rails, respectively, and extending from the leading slider edge to the trailing slider edge.

3. A disc head slider comprising:

a slider body with leading, trailing, inside and outside slider edges;

a slider center line extending from the leading slider edge to the trailing slider edge;

first and second raised rails, each rail comprising an inside rail edge, an outside rail edge, a leading rail edge and a trailing rail edge and terminating prior to the trailing slider edge;

a raised center rail extending along the slider center line, between the first and second raised rails, and comprising a leading section, a waist section and a trailing section, wherein the raised center rail narrows from the leading and trailing sections of the raised center rail to the waist section of the raised center rail;

first and second cavities positioned between the raised center rail and the first and second raised rails, respectively, and extending from the leading slider edge to the trailing slider edge;

wherein the first and second raised rails each further comprises a leading section, a waist section, a leg section which extends from the waist section of the respective first and second raised rails to the leading section of the respective first and second raised rails, and a trailing section which extends from the waist section of the respective first and second raised rails to the respective trailing rail edge, wherein the leading sections of the first and second raised rails are each narrower than the leading section of the raised center rail, the inside and outside rail edges converge toward the slider center line for a distance along the leg sections, from the waist sections of the first and second raised rails toward the leading sections of the first and second raised rails, and the trailing sections of the first and second raised rails widen from the waist sections of the first and second raised rails toward the trailing rail edges of the first and second raised rails; and a notch positioned along each inside rail edge of the first and second raised rails, which narrows the respective trailing section of the first and second raised rails at the notch.

4. The disc head slider of claim 3 wherein the notch in the first raised rail extends in a direction from the first cavity toward the inside slider edge and extends from the trailing rail edge toward the leading rail edge of the first raised rail, and wherein the notch in the second raised rail extends in a direction from the second cavity toward the outside slider edge and extends from the trailing rail edge toward the leading rail edge of the second raised rail.

5. The disc head slider of claim 3 and further comprising:

a tapered surface formed within the first and second raised rails along the leading slider edge.

6. The disc head slider of claim 3 and further comprising:

a tapered surface formed within the first and second raised rails along the leading slider edge; and wherein the inside rail edges of the first and second raised rails converge along the leg sections at a first angle with respect to the slider center line from the waist sections of the first and second raised rails to the leading sections of the first and second raised rails and then converge at a second angle, which is greater than the first angle.

7. The disc head slider of claim 3 wherein the leading sections of the first and second raised rails have a constant width from the leg sections to the leading rail edges of the first and second raised rails.

8. The disc head slider of claim 3 wherein the raised center rail narrows adjacent the leg sections of the first and second raised rails and widens adjacent the notches in the first and second raised rails.

* * * * *